Oct. 8, 1957   F. E. BUDDENHAGEN ET AL   2,808,867
NOISELESS TIRE TREAD CONSTRUCTION
Filed Oct. 26, 1953   3 Sheets-Sheet 1

INVENTORS
FREDERICK E. BUDDENHAGEN,
EUGENE A. ROBERTS
BY Steward & Steward
their ATTYS.

Oct. 8, 1957  F. E. BUDDENHAGEN ET AL  2,808,867
NOISELESS TIRE TREAD CONSTRUCTION
Filed Oct. 26, 1953  3 Sheets-Sheet 2

INVENTORS
FREDERICK E. BUDDENHAGEN,
EUGENE A. ROBERTS
BY Steward & Steward
their ATTYS.

Oct. 8, 1957 F. E. BUDDENHAGEN ET AL 2,808,867
NOISELESS TIRE TREAD CONSTRUCTION
Filed Oct. 26, 1953 3 Sheets-Sheet 3

INVENTORS
FREDERICK E. BUDDENHAGEN,
EUGENE A. ROBERTS
BY Steward & Steward
their ATTYS.

United States Patent Office 2,808,867
Patented Oct. 8, 1957

2,808,867

NOISELESS TIRE TREAD CONSTRUCTION

Frederick E. Buddenhagen and Eugene A. Roberts, Hamden, Conn., assignors to The Armstrong Rubber Company, West Haven, Conn., a corporation of Connecticut Application October 26, 1953, Serial No. 388,344

5 Claims. (Cl. 152—209)

This invention relates to tires for vehicles and it relates more particularly to arrangements of the tractive elements on the tread of the tires for reducing the noise of the tires.

When an automobile or other vehicle is traveling along a road, its tires produce audible sounds which originate with the impact of the tractive elements in the tire tread upon he pavement of the road. Similar tractive elements produce similar sounds when they strike the road at the same speed and, if such impacts occur at regular intervals or occur in similar successive groups, resonance of the sounds produced by the individual impacts or groups of impacts results, causing an irritating hum or whine.

In recent years, it has become important, due to the introduction of low pressure tires and to the high speeds at which automobiles travel, to increase the tractive qualities of tires by providing narrow traction slots or cuts in the tread. This formation or siping, as it is commonly called, comprises narrow slots or cuts which may be either molded or cut into the surface of the tread. Under ordinary compressive stresses on the tread, the walls of the sipes press together in the portion of the tread which is in contact with the pavement, forming a substantially smooth tread surface in contact with the roadway. If traction or other lateral stresses, on the other hand, are applied to the tread by accelerating the engine or by applying the brakes of the automobile, the sipes open up at the tread surface presenting their edges to the road and thereby increasing the traction or gripping of the tire on the pavement.

Siping is commonly found in tires having a tread composed of substantially continuous circumferentially extending ribs separated by relatively wide grooves, which also extend circumferentially of the tire. The ribs in such treads are in many cases provided with a traction design along their edges, which may, for instance, comprise a series of saw-tooth shaped elements forming hills and valleys. If desired, these design elements, so-called, may be rounded projections or square lugs extending from the side of the rib, or they may be indentations in the side of the rib. In any case, ribbed tires having design elements of some sort provided along one or both edges of the ribs are readily distinguishable from the plain or straight rib type of tread, which have no design elements and which therefore do not have as good traction.

The present invention is particularly applicable in tire treads in which there are two primary tractive elements, namely, the hereinabove mentioned traction slots or sipes, which extend transversely of the circumferential rib and which usually intersect an edge thereof, and secondly the so-called design elements formed along the edge of the ribs. It is well understood in the art that a considerable amount of hum is produced if the above described design elements are equally spaced along the entire circumference of the tire. Similarly, if the sipes are also equally spaced, they too will produce a hum or whine of their own which, when combined with that caused by the design elements, greatly magnifies the overall noise of the tire due to resonance of the two sounds. Still another factor, which must be taken into account in considering the noise produced by the tractive elements of a tire tread, is the size of the tread lugs formed by the sipes in tread designs here contemplated. Thus, where a series of tread lugs of the same size occur at regular intervals along the tread, the sound originating from the individual impacts of identical tread lugs hitting the pavement at equal intervals adds to the intensity of the noise of the tire if the frequencies of the various noise producing elements are resonant.

A considerable degree of success has been achieved heretofore in reducing such tire noise by arranging the tractive elements in a manner so as to avoid resonance of the frequencies at which these tractive elements strike the road. The patent to Buddenhagen 2,612,928, for instance, discloses a tread construction in which the design elements and the sipes in each rib of the tread are arranged in successive groups along the circumference of the tire, so that the pitch frequencies produced by one type of element opposes the pitch frequency of the other type of element, thereby reducing resonance.

In the above-mentioned patent to Buddenhagen, the circumference of the tire is divided, in the usual manner, into a plurality of sequentially arranged pattern divisions, in which all of the sipes within each of these pattern divisions are equally spaced from each other and all of the design elements or peaks and valleys are likewise equally spaced from each other within each pattern division. The spacing of these elements, however, while shown uniform within each pattern division, varies from pattern division to pattern division. Furthermore, where the sipes form traction lugs within the rib, the lugs thus formed differ in size from one pattern division to the next.

It has now been found that the irritating hum or whine produced by ties having non-skid treads can be still further reduced by varying the spacing of the sipes and the design elements within each pattern division as well as by varying the spacing of these elements from one pattern division to another. Furthermore, the tread lugs formed by the sipes are of different size within some of the pattern divisions. It is therefore an object of this invention to provide a tire having a highly efficient non-skid tread in which the spacing and sizes of the tractive elements are so arranged as to reduced or substantially eliminate the noise of the tire. It is also an object of the invention to provided a commercially pracical tread design of the type referred to, in which there is no regular reoccurrence or periodicity of similar tractive elements along the circumference of the tread, yet in which the general uniform appearance of the tread is not destroyed.

The present invention, therefore, is embodied in an improved tire tread of the type having circumferentially extending substantially continuous ribs provided with design elements along the edges thereof and with sipes extending transversely across the ribs forming tread lugs therein. The tread is divided in the usual manner into pattern divisions which are sequentially arranged along the circumference of the tire. In accordance with the principles of the present invention, however, the spacing and therefore the timing of the impacts on the pavement of the individual design elements and of the sipes is varied in each case independently of each other within the several pattern divisions in such a way as to prevent resonance of the sounds originating from the tractive elements. Furthermore, the magnitude of the impacts is varied within certain of the pattern divisions by varying the size of the tread lugs therein, thereby still further avoiding any likelihood of similar elements striking the road at regular intervals.

Other objects and advantages of the invention will become apparent from the following detailed description of one embodiment of the invention as illustrated in the accompanying drawings, in which.

Figure 1:
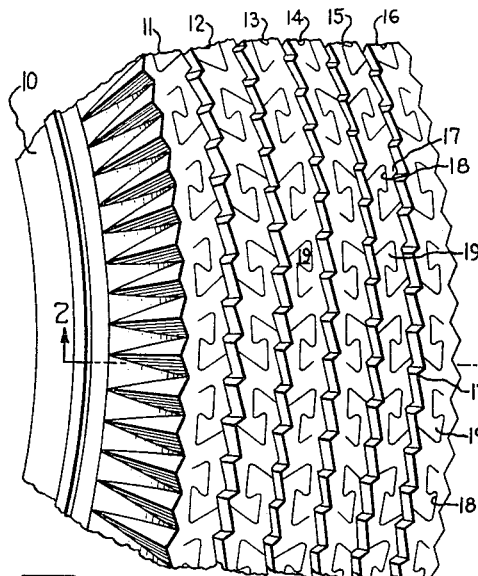
Fig. 1 is a fragmentary perspective view of a tire embodying the invention.

Referring to the drawings and particularly to Fig. 1, the over-all appearance of the embodiment of the invention here shown is generally similar to that disclosed in the copending application of James A. Walsh, Serial No. 150,191, filed March 17, 1950, now Patent No. 2,690,202, for tire casings with interlocking tread portions. Thus, the tire 10 is provided with circumferentially extending substantially continuous ribs 11–16, which are separated by relatively wide grooves, also extending circumferentially of the tire. The ribs 11–16 are formed on both sides with angular projections or design elements 17, which in this case are connected together in sequence along the side of each rib forming a more or less saw-tooth design. Each rib is further provided with a series of sequentially arranged traction slots or sipes 18 which extend from at least one edge of the rib transversely thereof to form S-shaped configurations which define tread lugs 19. It is of course understood that while the traction slots or sipes 18 specifically illustrated here are substantially S-shaped, they may of course be of various configurations such, for instance, as those shown in the abovementioned patent of James A. Walsh, or as shown in the design patent to Roberts D. 169,914, issued June 23, 1953.

With the exception of the outermost marginal serrated design in the tread shown, the design elements or peaks 17 in the particular embodiment shown are spaced at irregular intervals from each other throughout the circumference of the tread. In addition to the variation in the spacing of the peaks 17, the sipes 18 and, therefore, the tread lugs 19 defined by the sipes, are also spaced from each other at irregular intervals throughout the tread circumference. Consequently, there are in the present embodiment of the invention two principal types of tractive elements, each of which is arranged in series along the ribs of the tread so that their respective individual elements vary in spacing from each other in a nonuniform manner within the pattern divisions.

Figure 2:
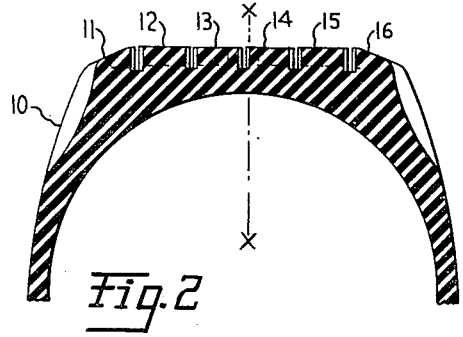
Fig. 2 is a section on line 2—2 of Fig. 1.
Figure 3:
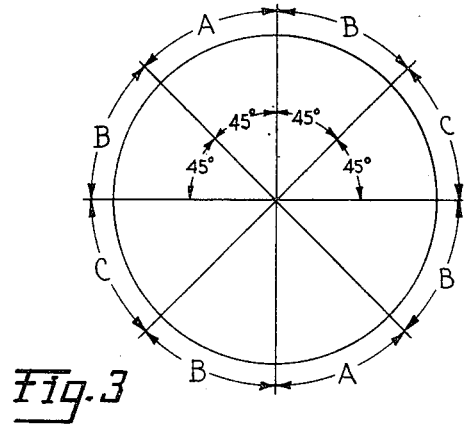
Fig. 3 is a diagrammatic view of a tire showing one way in which the tread elements formed therein may be grouped into pattern divisions.
Figure 4:
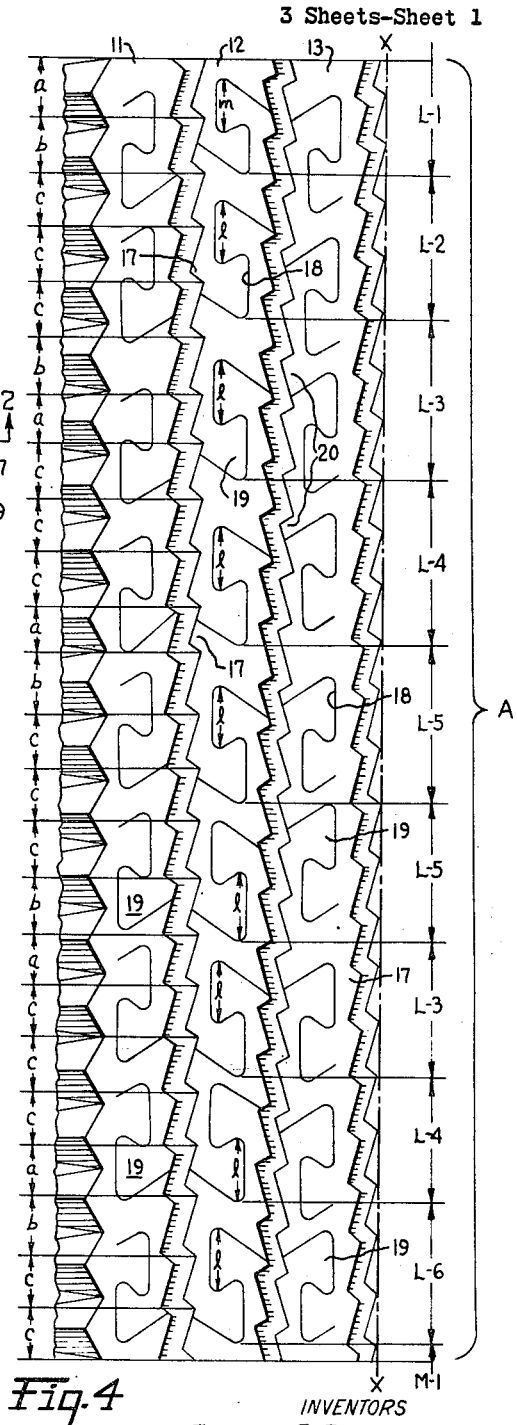
Figs. 4, 5 and 6 are developed plan views, on a larger scale, of three successive portions of the tire shown generally in Fig. 1.
Figure 5:
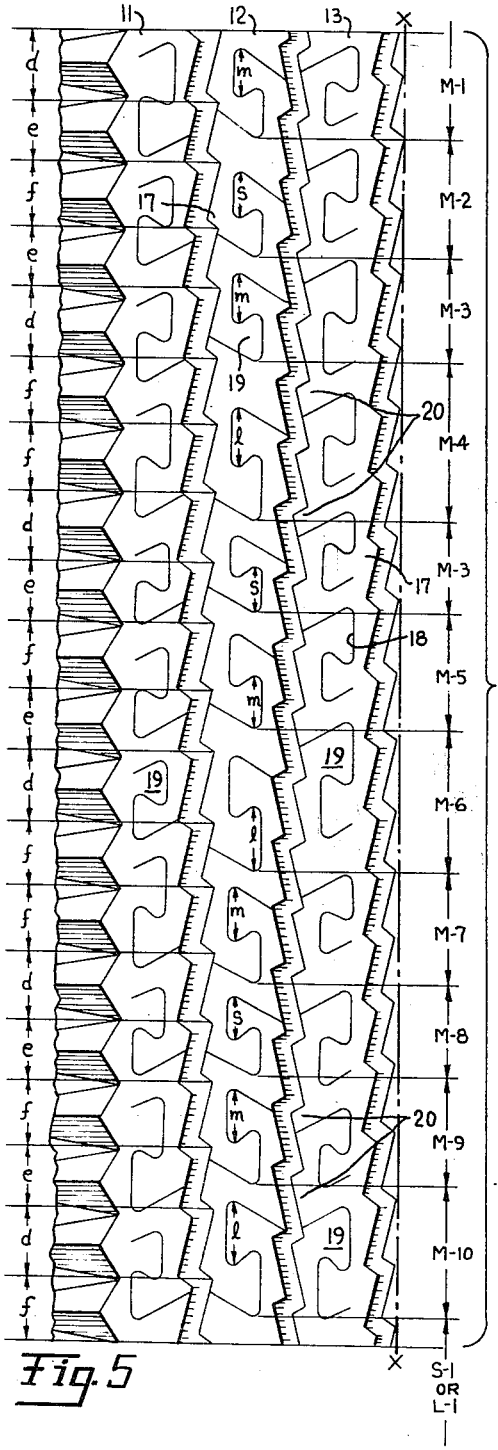
Figure 6:
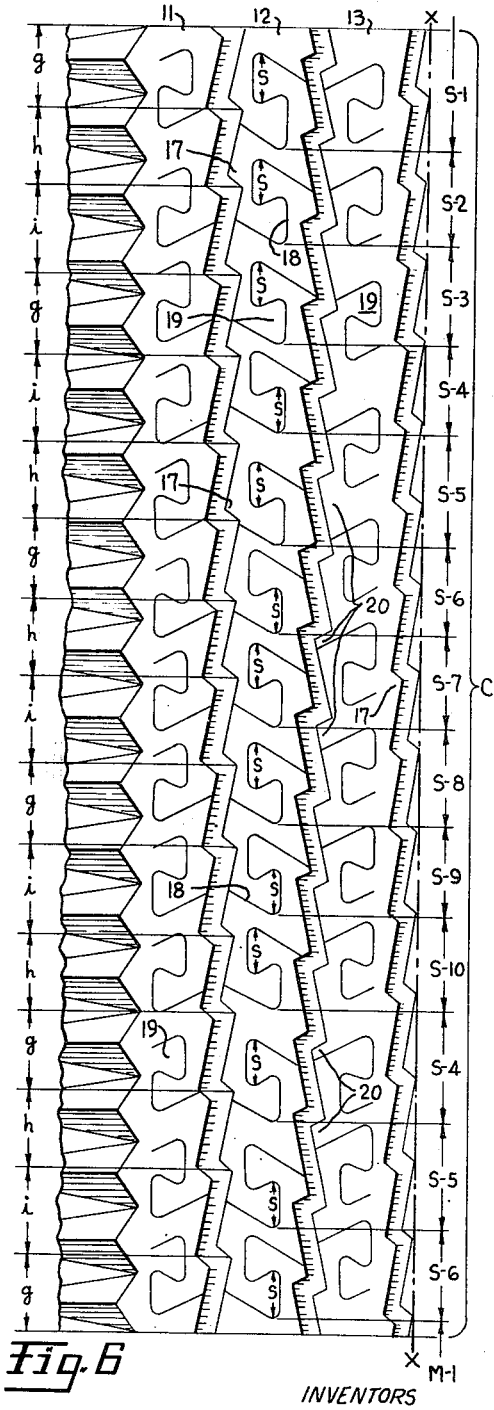

The hereinabove described tractive elements are grouped circumferentially of the tire into pattern divisions, designated as A, B and C (Fig. 3). In the present instance, the pattern divisions are all equal in length, each being one-eighth or 45° of the circumference of the tire and occurring in the sequence A, B, C, B, A, B, C, B. The number of pattern divisions may, if desired, be more or less than the number here shown and, moreover, they need not be of equal length, although this is more or less standard practice in the manufacture of tires today. Figs. 4, 5 and 6 are each to-scale drawings of the pattern divisions A, B and C, respectively, of the tire tread, showing the arrangements of the various tractive elements in detail. For purposes of clarity, only the portion to the left of the plane indicated by the line X—X in Fig. 2, including ribs 11, 12 and 13, is shown in Figs. 4–6. The plane X—X, which is a vertical plane passing slightly to the right of the center line of the tire as viewed in Fig. 2, actually represents the juncture of the two halves of the mold in which the tires are molded and cured. The design to the right of the plane X—X, which design is not shown in Figs. 4–6, is exactly the same as the design on the left side of the tire, except that in order to still further break up the periodicity of the sound producing vibrations, the sequence of the various spaces between the tractive elements is the reverse of that shown in Figs. 4–6. It is, however, not absolutely necessary to reverse the sequence of occurrence of the tractive elements on the opposite halves of the tread, since a substantial reduction in noise is effected by varying the spacing between the sipes and between the design elements within each pattern division and by varying the size of the tread lugs in each rib of the tread, as will be more fully brought out hereinafter.

In order to simplify the disclosure, specific reference to the arrangement of the tractive elements shown in detail in Figs. 4, 5 and 6, will be made only in connection with the rib 12 shown in each of these figures. The arrangements of the elements in the other ribs are in general similar to those for rib 12. However, since the manner in which the spacing and sizes of the several tractive elements may vary within each pattern division is almost without limit so long as such variations and combinations thereof produce a high degree of nonuniformity of the design, the sequence of occurrence of the sipes 18, the design elements 17 and the tread lugs 19 in the ribs 11, 13, 14, and 16, in embodiment of the invention here shown, is not the same as those for the rib 12 hereinafter described in detail. As has been pointed out hereinbefore, the arrangement of the elements in rib 15 (Fig. 1) is the same as that for rib 12, except that the sequences are reversed. Furthermore, it is desirable not to use identical arrangements of the elements in all the ribs, since the differences in the sequences of elements in the several ribs further contribute to the nonuniformity of the total design.

Referring now to the specific arrangement of tractive elements in the rib 12 shown in Figs. 4–6, the spacing or size of the design elements or peaks 17 on the left hand side of rib 12, as viewed in the drawings, is designated by the letters $a$, $b$, $c$, $d$, $e$, $f$, $g$, $h$ and $i$. Thus, in pattern division A (Fig. 4), the peaks occur at three different intervals indicated by the letters $a$, $b$, $c$, in the sequence $a$, $b$, $c$, $c$, $c$, $b$, $a$, $c$, $c$, $c$, $a$, $b$, $c$, $c$, $c$, $b$, $a$, $c$, $c$, $c$, $a$, $b$, $c$, $c$, which starts at the top of the pattern division as viewed in Fig. 4. In pattern division B shown in Fig. 5 the peaks are spaced at the different intervals $d$, $e$, $f$, the average length of these intervals being somewhat longer than the average length of the corresponding spaces in pattern division A. The peak spacing in pattern division B follows the sequence, again starting at the top, $d$, $e$, $f$, $e$, $d$, $f$, $f$, $d$, $e$, $f$, $e$, $d$, $f$, $f$, $d$, $e$, $f$, $e$, $d$, $f$. In pattern division C shown in Fig. 6, on the other hand, the spaces between the peaks 17 are larger than those of either pattern division A or B. The letters $g$, $h$ and $i$ in Fig. 6 represent the different intervals at which the peaks 17 in pattern division C occur, the sequence of these various intervals being in this instance, and again starting at the top of the pattern division as seen in Fig. 6, $g$, $h$, $i$, $g$, $i$, $h$, $g$, $h$, $i$, $g$, $i$, $h$, $g$, $h$, $i$, $g$.

It becomes apparent therefore that the spaces between the peaks or so-called design elements vary not only from pattern division to pattern division, but also to an even greater extent within each division. The spacing of the design elements in pattern division A is relatively small on the average, while in pattern division C the average spacing of the design elements is relatively large, and in pattern division B the spaces are on the average of an intermediate length. However, it is important to note that the spaces also vary in length within each of the three different pattern divisions in an irregular and generally unpredictable manner.

Referring now to the spacing between the sipes 18 as shown in connection with rib 12 of Figs. 4–6, it will be noted that these spaces are indicated by the letter L followed by a numeral in pattern division A (Fig. 4), by the letter M in pattern division B (Fig. 5) and by the letter S in pattern division C (Fig. 6). The spaces L between the sipes in pattern division A are on the whole larger than the medium size spaces M between the sipes in pattern division B, which in turn are for the most part larger than the small spaces S between the sipes in pattern division C. The spaces between the sipes within each pattern division, however, vary widely from one sipe to the next. Thus, in pattern division A of Fig. 4 the spaces L-1, L-2, L-3, L-4, L-5 and L-6 are each of different length. The variation in the length of these spaces is, moreover, not uniform, as is apparent from the chart shown in Fig. 7, which is explained more fully hereinafter. Similarly in pattern division B there is an even wider variety of medium size spaces indicated by the reference characters M-1 to M-10, and in pattern division C the small spaces are indicated by the reference characters S-1 to S-10.

It should be brought out here that the variation in the length of the spaces or the distances between the sipes does not progress from large to small (or vice versa) from one end of the pattern division to the other. Thus, as will become readily apparent by reference to Fig. 7, the spacing of both the sipes and the design elements becomes larger and smaller in a nonuniform manner along the entire length of the pattern division. Furthermore, it is important that the variations or the trends in the variations, of the spacing between the sipes 18 do not coincide with the variations, or the trends of the variations, in the design elements within any of the pattern divisions.

Figure 7:
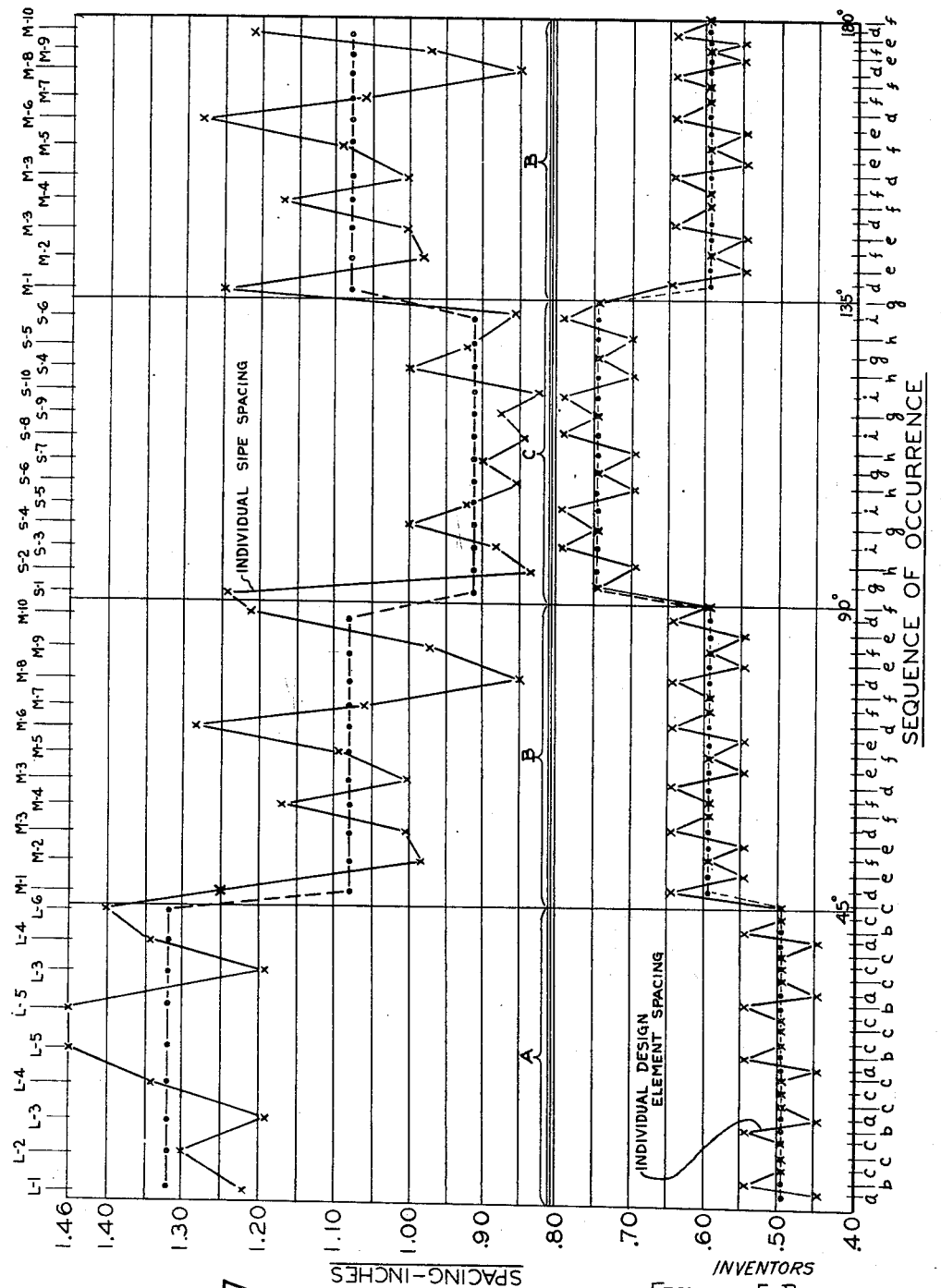
Fig. 7 is a chart showing the actual spacing of the individual sipes in relation to the spacing of the design elements of one of the ribs in a typical embodiment of the invention.

The irregularity in spacing of the individual sipes 18 and of the individual design elements 17 is clearly illustrated in Fig. 7, which is a chart plotting the spaces in inches between the sipe elements and the design elements, respectively, against the sequence in which these elements each occur in one half of the circumference of the tire which, in this instance, includes the sequence of pattern divisions A, B, C, B. The two occurrences or pattern division B in the chart are of course identical. The sequences and specific dimensions here given are for only ribs 12 and 15 of the tire shown in Fig. 1 and are purely illustrative, it being understood that innumerable different arrangements can be devised following the general principles of the invention. The dimensions shown in Fig. 7 and hereinafter tabulated are not, therefore, to be construed as in any way limiting the invention. It will also be understood that the dimensions will differ for each size tire, those given herein being for a size 8.00—15 passenger car tire.

The nonuniform spacing of the individual design elements is illustrated in the lower portion of Fig. 7 by the solid line graph, in which the sequence of occurrence of the individual peaks or design elements is indicated by an $x$. Likewise, the variations in the length of the spaces between the sipes is illustrated by a similar graph in the upper portion of Fig. 7. The two curves made up of alternating dots and dashes indicate the approximate average length of the spaces between the sipes and design elements, respectively, within each pattern division and brings out sharply how the spacing arrangements of the present invention clearly distinguish from the prior tread designs in which the intervals between elements varied only between pattern divisions and were uniform in length within each pattern division.

In a typical embodiment of the invention, the linear dimensions in inches for the spaces occupied by the individual design elements 17 of the rib 12 shown in the drawings are given in the following tables, the data therein corresponding to that in the chart of Fig. 7:

| a | b | c | d | e | f | g | h | i |
|---|---|---|---|---|---|---|---|---|
| .445 | .545 | .495 | .644 | .544 | .594 | .743 | .693 | .793 |

Similarly, the following tables show typical dimensions in inches of the different spaces between the sipes 18 in the rib 12 of the tread:

| L-1 | L-2 | L-3 | L-4 | L-5 | L-6 |
|---|---|---|---|---|---|
| 1.22 | 1.30 | 1.19 | 1.34 | 1.46 | 1.41 |

| M-1 | M-2 | M-3 | M-4 | M-5 | M-6 | M-7 | M-8 | M-9 | M-10 |
|---|---|---|---|---|---|---|---|---|---|
| 1.25 | .98 | 1.00 | 1.17 | 1.09 | 1.28 | 1.06 | .84 | .97 | 1.21 |

| S-1 | S-2 | S-3 | S-4 | S-5 | S-6 | S-7 | S-8 | S-9 | S-10 |
|---|---|---|---|---|---|---|---|---|---|
| 1.24 | .83 | .88 | 1.00 | .92 | .85 | .90 | .84 | .87 | .82 |

The above tables do not, however, show the particular sequences in which the elements occur, these being shown both in Figs. 4–6 and on the chart of Fig. 7.

It should be noted that with respect to the spaces between both the design elements 17 and the sipes 18 in the specific examples tabulated above, some of the individual spaces in the intermediate pattern division B are within the size range of the larger spaces of adjacent pattern divisions, while other spaces in the pattern division B are within the size range of the smaller spaces. Thus, as may be readily seen in Fig. 7 and in the above tables, the spaces M-1 and M-6, for instance, between certain individual sipes in pattern division B are longer than several of the spaces between the sipes in pattern division A. Similarly, the spaces $e$ between certain of the individual design elements in pattern division B are, in the particular arrangement here illustrated, slightly shorter than the spaces $b$ in pattern division A. Furthermore, the variations in length of the spaces between the sipes in pattern division B are, as is clearly shown in Fig. 7, even more pronounced than those in the pattern divisions A and C, all of which adds to the general nonuniformity of the whole tread design.

In the tread illustrated in Figs. 4–6, the relative sizes of, or spaces between, each of the design elements 17 are the same as those tabulated above for the rib 12. However, due to the almost infinite number of ways in which the spaces between the individual elements may be varied both in length and sequence of occurrence in different ribs or on opposite sides of the same rib, there is no correlation between the elements transversely across the tread from one rib to the next or, for that matter, from one edge of a rib to the opposite edge of the same rib. Furthermore, the sequence of occurrence of the sipes within each pattern division for the rib 13, for instance, is different from the corresponding sequence in rib 12. Consequently, since none of the spaces between either the design elements or the sipes is exactly the same transversely of the tread, at least in one half of the width of the tread, similar tractive elements of the tread are not likely to come in contact with the pavement at exactly the same instant, thus further tending to prevent resonance of sound frequencies.

In addition to the variations in the spacing of the sipes 18 and of the design elements 17 within the pattern divisions, the size of the tread lugs 19 formed by the sipes likewise changes along each rib. In the present embodiment of the invention there are three different size lugs, the large ones being designated by the letter $l$, the small ones by the letter $s$, and the medium size ones by the letter $m$. In pattern division A, the lugs are for the most part all large, and in pattern division C, they are small, while pattern division B contains a mixed sequence of all three sizes of tread lugs. It will be noted that the tread lugs 19 formed by the particular shape of the sipes 18 illustrated here appear in pairs, each of the two lugs comprising a pair being of the same size. Taking the lugs in pairs, the sequence in which these elements occur in rib 12 in pattern division B may be *m, s, m, l, s, m, l, m, s, m, l* as shown in Fig. 5.

Consequently, instead of providing groups of similar size lugs, buttons or the like, circumferentially along the tread surface as has been done heretofore, it is now proposed to vary the size of the lugs within these groups or pattern divisions. While the size of the lugs 19 could be varied within all the pattern divisions, it is thought to be more effective to change the size of successive lugs only in the so-called mean or intermediate pattern division B which, in the particular embodiment of the invention here described, occurs between each of the pattern divisions A and C in their predetermined sequence (Fig. 3) around the circumference of the tire. Thus, even greater nonuniformity is accomplished than would be the case if the sizes of the lugs were varied in all the pattern divisions. This is particularly so where, as here, the spacing of the elements varies in each of the divisions, so that the combination of varying the spacings throughout and of providing a certain amount of uniformity in the size of the lugs at widely spaced intervals along the circumference of the tire results in even greater nonuniformity in the total, over-all design.

Examples of the longest dimension, measured as indicated in Figs. 4, 5 and 6, in the different size lugs 19 in a 8.00—15 inch tire are as follows: $l=.62''$; $m=.53''$ and $s=.45''$.

It will also be observed that the variations in the spacing of the sipes 18 and the design elements 17 cause the sipes to intersect the design elements at different points along the similarly shaped, saw-tooth configurations at the edges of the ribs. This makes the tread portions 20 included between the sipes and the edge of the ribs, as clearly seen in Fig. 6 for instance, vary in size along each rib within each of the pattern divisions, thereby still further contributing to nonuniformity in design.

Although the described saw-tooth effect of the design elements 17 along most of the edges of ribs 11—16 is irregular throughout the circumference of the tires, the outermost marginal serrations on ribs 11 and 16, which serrations blend into the sidewalls of the tire as shown in Figs. 1 and 2, are uniform both in size and spacing. However, due to the manner in which the outer margins of ribs 11 and 16 recede from the plane of the road engaging surface of the tread as shown in Fig. 2, these outer elements do not strike the pavement with sufficient force to be of any consequence so far as tread noise is concerned. The primary purposes of these side formations are to lend a certain desired appearance to the tire and to avoid heating of the tire in the area where the rubber is thickest. They do, however, give the tire better traction in snow or mud, in which case noise is not a factor anyway. So far as noise is concerned, therefore, these outside design elements play little or no part, and for all practical purposes may be disregarded.

It becomes apparent from the foregoing detailed description of one particularly desirable form of the invention that this invention is an important step forward beyond previous attempts which have been made to reduce tire noise by breaking up the periodicity of similar tractive elements. Thus, it has not been suggested heretofore, in commercially practical tire designs capable of being manufactured on a large scale and at reasonable cost, to space the design elements and the sipes at irregular intervals within the pattern divisions along a circumferentially extending rib of the tread. Prior developments in this direction have been made only in connection with similar elements occurring across the whole width of the tread not, as in the present invention, in the same rib. Furthermore, where the spacing has been varied between individual tractive elements, such variations have been more or less uniform and have not been combined with variations in the spacing of other types of tractive elements in the manner here disclosed.

Consequently, in carrying out the principles of this invention, a non-skid tread design is provided, which has unusual tractive qualities under all kinds of road conditions, because of the presence therein of both the more or less coarse design elements, so-called, along the edges of the tread ribs and the large amount of siping, which in recent years has proven to be a highly effective means for increasing the traction of a tire. Yet, despite the vast improvement in the traction of the tread, which ordinarily would mean that the hum or whine of the tire would be increased correspondingly, the noise produced by tires embodying the present invention is no greater, and is often considerably less, than in tires which are incapable of providing anywhere near the amount of traction that the tire here disclosed possesses. Moreover, although the arrangement of the tractive elements according to the present invention is almost completely nonuniform, a general, over-all appearance of uniformity of the tread design is maintained.

What is claimed is:

1. A tire having a tire tread comprising a plurality of circumferentially extending substantially continuous ribs each having a plurality of sequentially arranged design-elements comprising hills and valleys formed along an edge of said rib and a plurality of spaced sipes arranged circumferentially of said rib and extending transversely thereof, each of said sipes defining at least one tread-lug in said rib, said tread being divided circumferentially on opposite sides of the center line thereof into a sequence of pattern-divisions which are each of equal length, the average distance between corresponding points on adjacent sipes and on adjacent design-elements, respectively, being similar within each pattern-division but different from one pattern-division to the next, while the distances between certain adjacent design-elements in each rib are different from others in the same rib within each of said pattern-divisions, the spacing of said design-elements in their sequence within each pattern-division being irregular; the spacing of said sipes within each pattern-division also differing irregularly from one sipe to the next, the variations in the distances between adjacent ones of said design-elements within each pattern-division being independent of and substantially non-coincident with the variations in the distances between adjacent ones of said sipes in the same rib and pattern-division; said tread-lugs within at least some of said pattern-divisions being of a plurality of different sizes occurring in irregular order along said rib.

2. A tire having a tire tread as defined in claim 1 wherein the arrangements of said design-elements and sipes are different from one rib to the next transversely of said tire tread.

3. A tire having a tire tread as defined in claim 1 wherein the average distance between said sipes in a first of said pattern-divisions is relatively long and the average distance between said design-elements in the same pattern-division is relatively short; the average distance between said sipes in a second of said pattern-divisions being short with respect to the corresponding distance in said first pattern-division, while the average distance between said design-elements in said second pattern-division is long relative to the corresponding distance in said first pattern-division; and the average distance between said sipes and between said design-elements, respectively, in a third of said pattern-divisions being of intermediate length relative to the respective corresponding distances in said first and second pattern-divisions.

4. A tire having a tire tread as defined in claim 3 wherein said pattern-divisions are each one-eighth of the circumference of said tire and occur in a sequence wherein said third pattern-division always occurs between said first and second pattern-divisions.

5. A tire having a tire tread comprising a plurality of circumferentially extending substantially continuous ribs each having a plurality of sequentially arranged design-elements comprising hills and valleys formed along an edge of said rib and a plurality of spaced sipes arranged circumferentially of said rib and extending transversely thereof, each of said sipes defining at least one tread-lug in said rib, said tread being divided circumferentially on opposite sides of the center line thereof into a sequence of pattern-divisions which are each of equal length, the average distance between corresponding points on adjacent sipes and on adjacent design-elements, respectively, being similar within each pattern-division, but different from one pattern-division to the next, while the distances between certain adjacent design-elements in each rib are different from others in the same rib within each of said pattern-divisions, the spacing of said design-elements in their sequence within each pattern-division being irregular; the spacing of said sipes within each pattern-division also differing irregularly from one sipe to the next, the variations in the distances between adjacent ones of said design-elements within each pattern-division being independent of and substantially non-coincident with the variations in the distances between adjacent ones of said sipes in the same rib and pattern-division; said pattern-divisions comprising three different types which may be designated as A, B, and C, the pattern-divisions of each type being identical, the tread-lugs within pattern-divisions A being relatively large and of substantially uniform size, while the tread-lugs within pattern-divisions C are of uniformly smaller size, pattern-divisions B having tread-lugs of a size intermediate those in said pattern-divisions A and C intermixed with tread-lugs of similar size to those in both pattern-divisions A and C, pattern-division B occurring after every other pattern-division in the sequence thereof.

References Cited in the file of this patent

UNITED STATES PATENTS

| | | |
|---|---|---|
| 2,006,197 | Ewart | June 25, 1935 |
| 2,124,821 | Hubach | July 26, 1938 |
| 2,612,928 | Buddenhagen | Oct. 7, 1952 |
| 2,690,202 | Walsh | Sept. 28, 1954 |

FOREIGN PATENTS

| | | |
|---|---|---|
| 492,214 | Great Britain | Sept. 16, 1938 |